(12) United States Patent
Lin

(10) Patent No.: US 6,340,969 B1
(45) Date of Patent: Jan. 22, 2002

(54) DISPLAY ADJUSTMENT DEVICE FOR PERSONAL COMPUTERS AND METHOD OF CONTROL THEREOF

(75) Inventor: Wen-Feng Lin, Taipei (TW)

(73) Assignee: Mitac Technology Corp., Hsinchu (TW)

( * ) Notice: Subject to any disclaimer, the term of this patent is extended or adjusted under 35 U.S.C. 154(b) by 0 days.

(21) Appl. No.: 09/378,302

(22) Filed: Aug. 20, 1999

(30) Foreign Application Priority Data

Sep. 10, 1998 (TW) .......................................... 87115113

(51) Int. Cl.$^7$ ................................................ G09G 5/00
(52) U.S. Cl. .......................... 345/211; 345/690; 345/89
(58) Field of Search ................................ 345/211, 212, 345/213, 204, 205, 206, 690, 691, 694, 698, 699, 87, 88, 89, 98, 100

(56) References Cited

U.S. PATENT DOCUMENTS

| 5,229,761 A | * | 7/1993 | Fuse ............................. 345/99 |
| 5,532,718 A | * | 7/1996 | Ishimaru ....................... 345/211 |
| 5,805,150 A | * | 9/1998 | Nishino et al. .............. 345/213 |
| 6,137,462 A | * | 10/2000 | Kim ............................. 345/94 |

\* cited by examiner

Primary Examiner—Xiao Wu
(74) Attorney, Agent, or Firm—Darby & Darby

(57) ABSTRACT

A display adjustment device and method of control thereof are disclosed. The display adjustment device comprises a selector, a resistor set, and an AC/DC (alternate current/direct current) converter. The selector generates a logic pattern in accordance with a first control signal and a second control signal. The resistor set provides an input resistance in accordance with the logic pattern. The AC/DC converter adjusts control of the display in accordance with the input resistance.

19 Claims, 2 Drawing Sheets

DISPLAY ADJUSTMENT DEVICE FOR PERSONAL COMPUTERS AND METHOD OF CONTROL THEREOF

BACKGROUND OF THE INVENTION

1. Field of the Invention

The present invention relates to personal computer (PC) technology, particularly to a display adjustment device for a PC and a method of control thereof.

2. Description of the Related Art

In PCs with LCD (liquid crystal display) display units or all-in-one PCs such as notebook computers, the overall design has been restricted due to concerns of the integration of the display with the main unit and manufacturing cost. For example, the area of the panel has been limited, and fewer adjustment knobs or buttons than those on desktop PCs have been provided for adjusting the brightness and contrast of the display unit.

SUMMARY OF THE INVENTION

Accordingly, an object of the present invention is to provide a display adjustment device and method of control thereof that minimizes the hardware requirements of adjustment knobs while realizing the effects of adjusted brightness and contrast in the limited space of the display panel of an integrated PC.

The above object can be realized with the display adjustment device of the present invention. Said display adjustment device comprises a selector, a resistor set, and an AC/DC (alternate current/direct current) converter. Said selector generates a logic pattern in accordance with a first control signal and a second control signal. Said resistor set provides an input resistance in accordance with the logic pattern. Said AC/DC converter adjusts control of the display in accordance with the input resistance.

Further, the above object can be realized with the method of control of the present invention. Said method of control comprises the following steps. First, a first control signal and a second control signal are generated in accordance with a brightness setting. Next, a selector generates a logic pattern in accordance with the first control signal and the second control signal. Further, a resistor set variably provides an input resistance to an AC/DC converter in accordance with the logic pattern. The AC/DC converter adjusts the control of a display unit.

BRIEF DESCRIPTION OF THE DRAWINGS

The aforementioned objects, features and advantages of the present invention will become apparent by referring to the following detailed description of a preferred embodiment with reference to the accompanying drawings, wherein.

DETAILED DESCRIPTION OF THE PREFERRED EMBODIMENT

Figure 1:
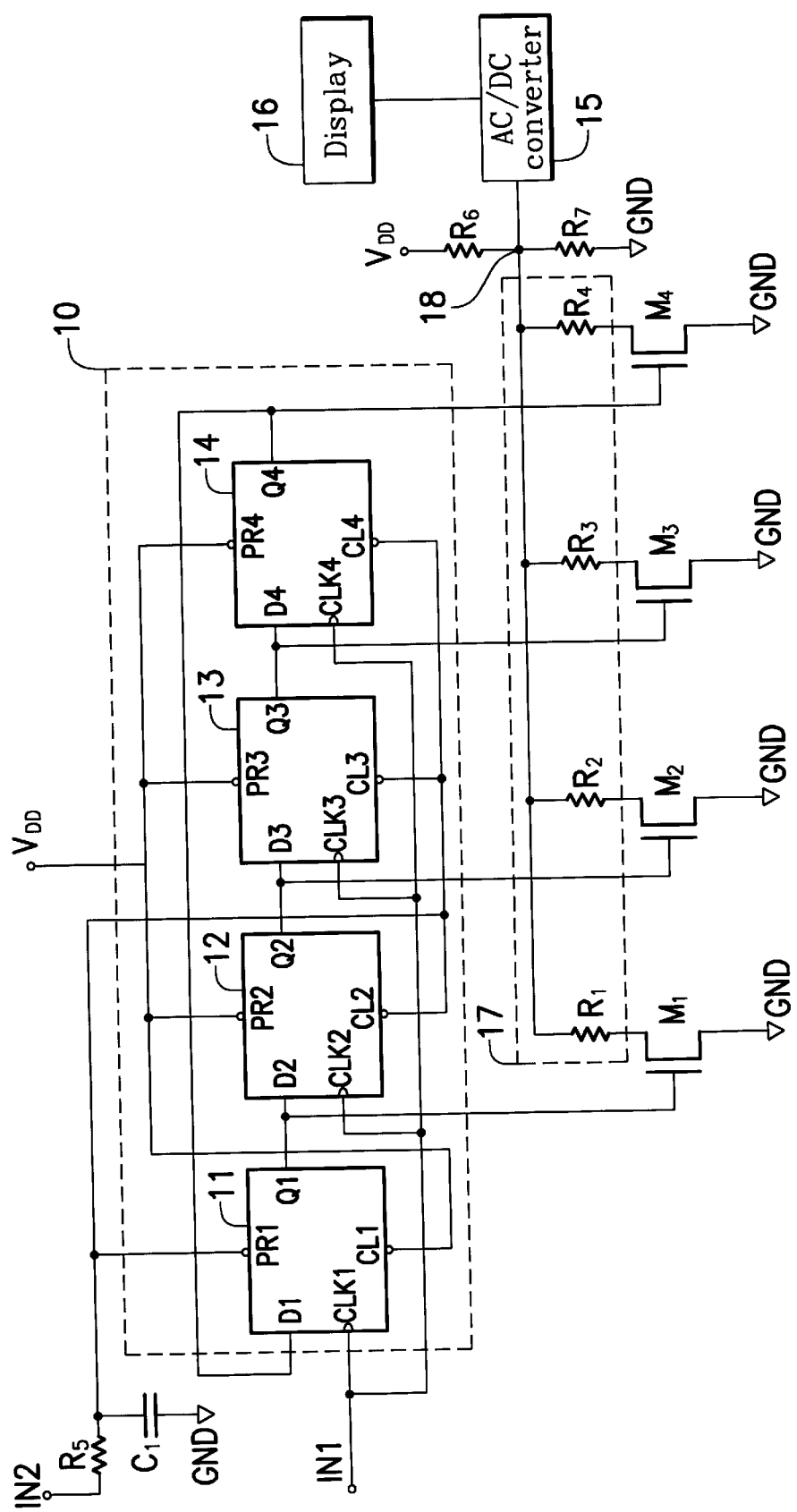
FIG. 1 is a diagram illustrating the circuit of one preferred embodiment of the display adjustment device of the present invention.

Referring to FIG. 1, a diagram illustrating the circuit of a preferred embodiment of the display adjustment device of the present invention. In accordance with the present invention, a selector 10 variably provides various resistance value to an AC/DC converter 15 in accordance with a first control signal IN1 and a second control signal IN2. The present invention can be applied to adjust either brightness or contrast. For convenience sake, the adjustment of brightness will be illustrated in the present invention. The adjustment control of contrast can be similarly applied.

According to one preferred embodiment of the present invention, the selector 10 is realized with a closed loop formed with a plurality of flip-flops connected serially. In FIG. 1, only four flip-flops are used for illustration but this should not be used to limit the scope of the present invention. Each of the flip-flops 11–14 comprises a data input end D, a data output end Q, a clock input end CLK, a preset end PR, and a clean end CL. As shown in FIG. 1, the flip-flop 11 comprises a data input end D1, a data output end Q1, a clock input end CLK1, a preset end PR1, and a clean end CL1. The flip-flop 12 comprises a data input end D2, a data output end Q2, a clock input end CLK2, a preset end PR2, and a clean end CL2. The flip-flop 13 comprises a data input end D3, a data output end Q3, a clock input end CLK3, a preset end PR3, and a clean end CL3. The flip-flop 14 comprises a data input end D4, a data output end Q4, a clock input end CLK4, a preset end PR4, and a clean end CL4.

Said flip-flops 11–14 are connected in serial to form a loop, that is, the data output end Q1 of the flip-flop 11 is connected to the data input end D2 of the flip-flop 12; the data output end Q2 of the flip-flop 12 is connected to the data input end D3 of the flip-flop 13; the data output end Q3 of the flip-flop 13 is connected to the data input end D4 of the flip-flop 14; and the data output end Q4 of the flip-flop 14 is connected to the data input end D1 of the flip-flop 11.

In addition, the first control signal IN1 is concurrently provided to the clock input ends CLK1–CLK4 of the flip-flops 11–14. A power supply $V_{DD}$ is concurrently provided to the clear end CL1 of the flip-flop 11 and to the preset ends PR2–PR4 of the flip-flops 12–14. The second control signal IN2, after being delayed by the resistor $R_5$ and the capacitor $C_1$, is concurrently provided to the preset end PR1 of the flip-flop 11 and to the clear ends CL2–CL4 of the flip-flops 12–14.

In accordance with the present invention, the selector 10 selects from a set of the resistors 17 to provide variable input resistance values to the AC/DC converter 15. For example, the resistor set 17 may comprise a plurality of resistors coupled in parallel between the AC/DC converter 15 and the ground GND, said resistors having various resistance values. If there are four flip-flops, then there are also four resistors. For example, there are four resistors $R_1$–$R_4$ in FIG. 1, each of the resistors $R_1$, $R_2$, $R_3$, and $R_4$ having a different resistance. Moreover, each of transistor switches $M_1$, $M_2$, $M_3$, or $M_4$ is respectively implemented in the parallel path of each of the resistors $R_1$, $R_2$, $R_3$, and $R_4$. The data output ends Q1–Q4 of the flip-flops 11–14 are respectively connected to the gate of the transistor switches $M_1$, $M_2$, $M_3$, and $M_4$, for controlling the ON and OFF state of the corresponding transistor switches $M_1$, $M_2$, $M_3$, or $M_4$.

Furthermore, the resistors $R_6$ and $R_7$ are connected in series between the power supply voltage $V_{DD}$ and the ground GND as the DC biased voltage for the input end 18 of the AC/DC converter 15.

The operation of the adjustment device of FIG. 1 will be further described in detail as follows.

When the power of PC is turned on, the power supply $V_{DD}$ rises to the voltage level of 5V or 3.3 V, and the first control signal IN1 and the second control signal IN2 are preset to a logic high level. When the brightness is adjusted, the second control signal IN2 generates a pulse from high level to low level to the preset end PR1 and the clear ends CL2–CL4 of flip-flops 12–14, so the data output end Q1 of the flip-flop 11 is preset to logic high, and the data output ends Q2–Q4 of the flip-flops 12–14 are cleared and set to logic low, that is, the logic pattern of (Q1,Q2,Q3,Q4)=(1,0,0,0). Later, the second control signal IN2 rises to logic high and latches the status of (Q1,Q2,Q3,Q4)=(1,0,0,0).

The logic high level of the data output end Q1 of the flip-flop 11 is delivered to the gate electrode of the transistor $M_1$ to turn on the transistor switch $M_1$, while the logic low levels of the data output ends Q2–Q4 of the flip-flops 12–14 are delivered to the gate electrodes of the transistors $M_2$–$M_4$ to turn off the transistor switches $M_2$–$M_4$. Therefore, only the resistor $R_1$ of the resistor set 17 is connected to the AC/DC converter 15.

If the brightness needs to be adjusted, the flip-flops 11–14 are triggered by the falling edge, and then a pulse from a high level to a low level is generated by the first control signal IN1. At this moment, the flip-flops 11–14 serve as a right shift register to shift the logic high level of the data input end Q1 of the flip-flop 11 to the right to the data output end Q2 of the flip-flop 12, that is, in a logic pattern of (Q1,Q2,Q3,Q4)=(0,1,0,0). Consequently, the logic high level at the data output end Q2 of the flip-flop 12 will turn on the transistor switch $M_2$, whereas the logic low level at the data output ends Q1, Q3, and Q4 of the flip-flop 11, 13, and 14 will turn off the transistor switches $M_1$, $M_3$, and $M_4$. Hence, the resistor $R_2$ of the resistor set 17 is connected to the AC/DC converter 15.

Similarly, if the resistor $R_3$ of resistor set 17 is to be connected to the AC/DC converter 15, then two pulses from a high level to a low level can be generated by the first control signal IN1. If the resistor $R_4$ of resistor set 17 is to be connected to the AC/DC converter 15, then three pulses from a high level to a low level can be generated by the first control signal IN1.

Since the resistors $R_1$, $R_2$, $R_3$, and $R_4$ of the resistor set may vary in the resistance, the resistance of the resistor set 17 and the resistance provided to the AC/DC converter 15 may be changed to change the biased voltage at the input end 18 of the AC/DC converter 15. Next, through the alternation from DC to AC by the AC/DC converter 15, the brightness control of the display unit 16 can be adjusted. Said display unit 16 can be a flat panel display such as an LCD (liquid crystal display), field emission display, or a vacuum fluorescent display. Further, the present invention can be applied to the adjustment control of the cathode-ray tube (CRT) display unit of the desktop PC.

Figure 2:
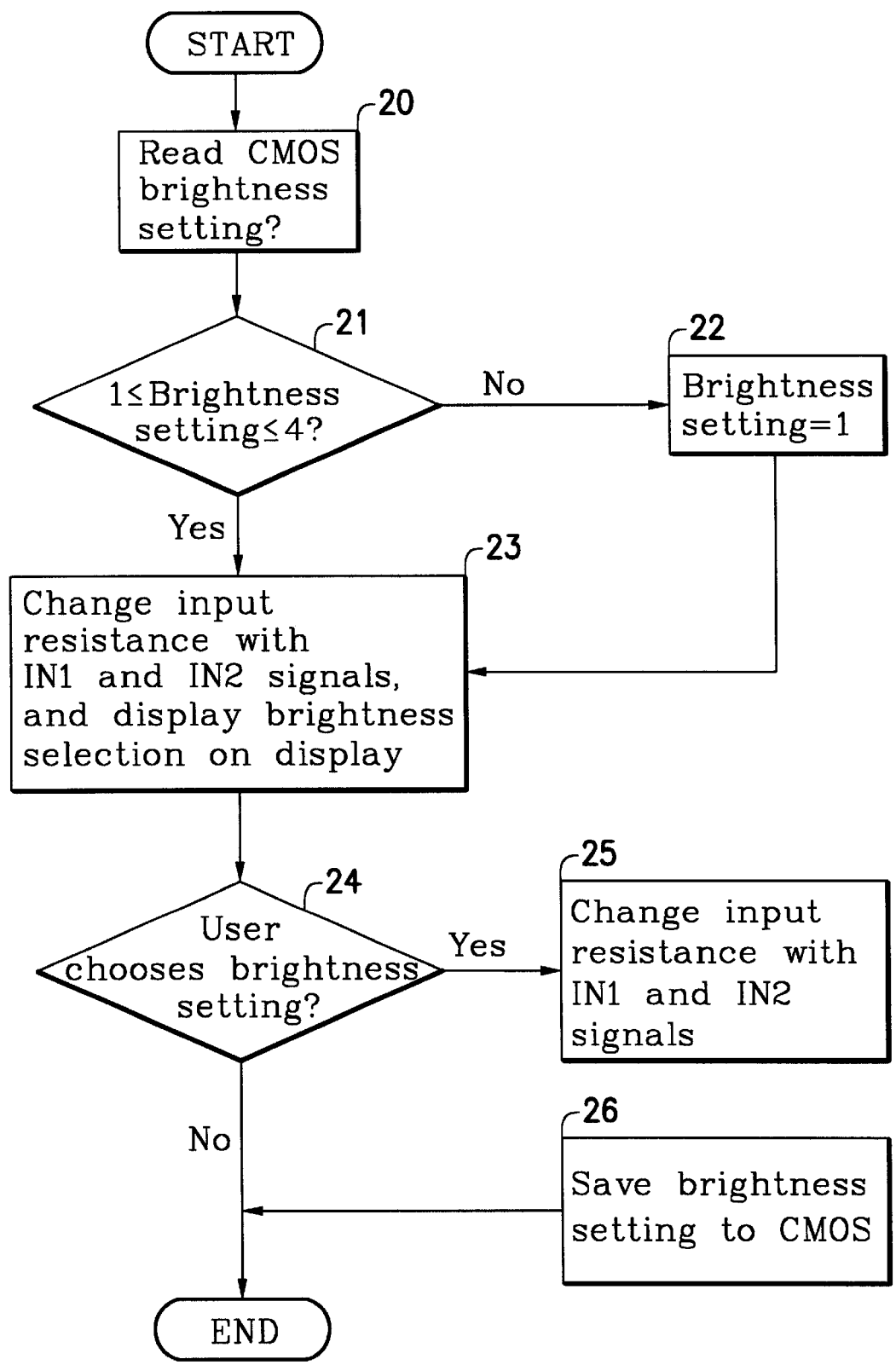
FIG. 2 is a flowchart illustrating the control of the display adjustment device applied to a PC.

Referring to FIG. 2, a flowchart illustrating the control of the display adjustment device applied to a PC. As shown in FIG. 2, when the PC is turned on, the setting of the brightness in the CMOS is first read in Step 20, said brightness setting having been saved before the PC was turned off (as shown in Step 26). Further, the read-out brightness setting is determined in Step 21, where the brightness setting is a numerical value between 1 and 4 in this embodiment with a four-level brightness adjustment. If the brightness setting is not a numerical value between 1 and 4, then proceed to Step 22 to set the brightness to the default of 1 and then go to Step 23. If the brightness setting is a numerical value between 1 and 4, then proceed to Step 23 to set the logic state of the control signals IN1 and IN2 in the aforementioned manner in accordance with the brightness setting. At the same time, a brightness selection picture is displayed for users to select the brightness.

Further, it is determined in Step 24, whether or not the brightness setting has changed. If not, then end this control flow. If the user has changed the brightness setting in Step 24, then proceed to Step 25 to set the control signals IN1 and IN2 in above manner in accordance with the changed brightness setting and change the resistance of the AC/DC converter 15 inputted from the resistor set 17 for adjusting the required brightness. When Step 25 is completed, then proceed to Step 26 to deliver the brightness setting to the CMOS for saving and end this flow after the setting is saved.

The above embodiment is illustrated only with a four-level brightness. By similar means, multiple-level brightness adjustment can be realized by increasing the number of the flip-flops in the selectors 10 and the resistors of the resistor set 17. Moreover, the above embodiment is illustrated only with brightness adjustment. Likewise, the same means could also be applied to the adjustment control of the contrast.

To summarize, the selector 10 controls the resistor set 17 in providing various input resistances to the AC/DC converter 15 in accordance with the first control signal IN1 and the second control signal IN2 in the present invention. The first control signal IN1 and the second control signal IN2 only occupy two pins in a general purpose input/output (GPIO) interface for realizing a multiple-level adjustment control. Consequently, the hardware requirements for the adjustment knob can be reduced while realizing effects of multiple-level adjustment of brightness or contrast of a display unit in a limited panel area.

Although the present invention has been described in its preferred embodiment, it is not intended to limit the invention to the precise embodiment disclosed herein. Those who are skilled in this technology can still make various alterations and modifications without departing from the scope and spirit of the present invention. Therefore, the scope of the present invention shall be defined and protected by the following claims and their equivalents.

What is claimed is:

1. A display adjustment device, comprising:
    a selector for generating a logic pattern in response to a first control signal and a second control signal wherein the selector further comprises a plurality of flip-flops connected in series and formed into a loop;
    a resistor set for variably providing an input resistance in response to said logic pattern; and
    an AC/DC converter for adjusting control of a display in response to said input resistance.

2. The display adjustment device as claimed in claim 1 further comprising a plurality of switches, each switch having an ON/OFF status, wherein the ON/OFF status of each of said switches is controlled by an output end corresponding to one of said flip-flops.

3. The display adjustment device as claimed in claims 2, wherein said resistor set comprises a plurality of flip-flops connected in parallel, each of said resistors being connected between one of said switches and said AC/DC converter.

4. The display adjustment device as claimed in claim 1, wherein said first control signal and said second control signal are transmitted through two pins of a GPIO interface, respectively.

5. The display adjustment device as claimed in claim 1, wherein said second control signal reaches to said selector through a delay circuit.

6. A method for controlling a display adjusting device, comprising the follow steps of:
    (a) generating a first control signal and a second signal in response to brightness setting, by using a selector which comprises a plurality of flip-flops connected in series and formed into a loop;

(b) generating a logic pattern in response to said first control signal and said second control signal;

(c) variably providing an input resistance to an AC/DC converter with a resistor set in response to said logic pattern and (d) controlling a display unit by said AC/DC converter in response to said input resistance.

7. The method as claimed in claim 6, wherein said first control signal and said second control signal are transmitted through two pins of a GPIO interface, respectively.

8. The method as claimed in claim 6, wherein said controlling step comprises setting the brightness of said display unit.

9. The method as claimed in claim 8, wherein said brightness setting is saved in a CMOS of a computer.

10. The method as claimed in claim 8, wherein a user can modify said brightness setting through a user interface.

11. The method as claimed in claim 6, wherein said controlling step comprises setting the contrast of said display unit.

12. The method as claimed in claim 11, wherein said contrast setting is saved in a CMOS of a computer.

13. The method as claimed in claim 11, wherein a user can modify said contrast setting through a user interface.

14. The method of claim 6 further comprising the step of controlling an ON/OFF status of one of a plurality of switches in the device by an output end corresponding to one of the flip-flops in the selector.

15. A display adjustment device comprising:

a selector for generating a logic pattern in response to a first control signal and a second control signal;

a resistor set for variably providing an input resistance in response to said logic pattern;

an alternate current/direct current (AC/DC) converter for adjusting control of a display in response to said input resistance; and wherein said second control signal reaches said selector through a delay circuit.

16. The device of claim 15 wherein the selector further comprises a plurality of flip-flops connected in series and formed into a loop.

17. The device of claim 16 further comprising a plurality of switches, each switch having an ON/OFF status, wherein the ON/OFF status of each of the switches is controlled by an output end corresponding to one of the flip-flops.

18. The device of claim 17 wherein the resistor set further comprises a plurality of flip-flops connected in parallel, each of the resistors being connected between one of the switches and the AC/DC converter.

19. The device of claim 15 wherein said first control signal and said second control signal are transmitted through two pins of a general purpose input/output (GPIO) interface.

* * * * *